United States Patent
Rakieski

[11] Patent Number: 5,090,738
[45] Date of Patent: Feb. 25, 1992

[54] PLASTIC COATING FOR PIPE COUPLINGS

[75] Inventor: Kenneth E. Rakieski, Gifford, Pa.

[73] Assignee: Dresser Industries, Inc., Dallas, Tex.

[21] Appl. No.: 519,245

[22] Filed: May 1, 1990

Related U.S. Application Data

[60] Continuation of Ser. No. 301,831, Jan. 26, 1989, abandoned, which is a division of Ser. No. 88,426, Aug. 24, 1987, Pat. No. 4,827,596.

[51] Int. Cl.$^5$ .............................................. F16L 11/12
[52] U.S. Cl. ........................................ 285/45; 285/55; 285/342; 285/351; 285/369
[58] Field of Search .................... 285/45, 337, 52, 351, 285/55, 342, 364

[56] References Cited

U.S. PATENT DOCUMENTS

| | | | |
|---|---|---|---|
| 602,564 | 4/1898 | Peeples | 285/52 |
| 1,814,480 | 7/1931 | Metcalf et al. | 285/351 X |
| 2,574,191 | 11/1951 | Platzer | 285/52 |
| 2,646,822 | 7/1953 | Ferguson | 285/332.3 X |
| 2,842,383 | 7/1958 | Merrill | 285/337 X |
| 2,863,678 | 12/1958 | Gordon et al. | 285/351 X |
| 2,867,463 | 1/1959 | Snider | 285/52 X |
| 3,675,950 | 7/1972 | Beene | 285/45 |
| 3,695,642 | 10/1972 | DeWoody | 285/351 X |
| 3,799,584 | 3/1974 | Slocum | 285/45 |
| 3,915,478 | 10/1975 | Al et al. | 285/45 |
| 3,944,262 | 3/1976 | Stiner et al. | 285/53 |
| 4,066,283 | 1/1978 | Struck | 285/53 |
| 4,296,950 | 10/1981 | Chamberlin | 285/45 |
| 4,422,674 | 12/1983 | Steuernagle | 285/45 X |

OTHER PUBLICATIONS

Sketches, provided by the inventor's assignee, showing Previous Coating Method, p. 1.

Primary Examiner—Dave W. Arola
Attorney, Agent, or Firm—Richards, Medlock & Andrews

[57] ABSTRACT

An improved method of coating a pipe coupling with a corrosion resistant polymeric coating includes coating an entire coupling, then simultaneously forming an upstanding flange on the coupling body when, in the parting process, the body and nut are separated. The improved coupling is adapted to utilize a moisture barrier between thee nut and the flange.

7 Claims, 1 Drawing Sheet

PLASTIC COATING FOR PIPE COUPLINGS

This application is a continuation of application Ser. No. 301,831, filed Jan. 26, 1989, now abandoned, which is a division of Ser. No. 088,426 filed Aug. 24, 1987, now U.S. Pat. No. 4,827,596.

TECHNICAL FIELD

This invention relates to a plastic coated pipe coupling, and more particularly to a plastic coated pipe coupling having an integral roller formed on the coupling nut coating or an integral upstanding flange formed on the coupling body coating.

BACKGROUND ART

Sections of pipe may be joined with a coupling. Metallic couplings are strong and reliable, but they are subject to corrosion when utilized to join pipe which is buried underground. To prevent corrosion, plastic coating methods have been developed. Conventional plastic coating technology requires that coupling parts be individually coated, trimmed and later assembled into their final configuration. The need for individual fixtures and trimming operations makes the conventional plastic coating process costly.

SUMMARY OF THE INVENTION

It is therefore an object of the present invention to provide a method of coating a pipe coupling with a corrosion resistant plastic, which is less complex and more cost effective than the conventional technology.

These and other objects of the present invention are met by providing a plastic coating process which includes assembling at least one cylindrical coupling body having exterior threads at at least one end, a nut threadedly engaged with the coupling body exterior threads, and a mandrel passing concentrically through the nut and body. The assembled fixture is introduced into a liquified plastic. The assemblies are then removed from the liquid plastic and cured in an oven. The assemblies are rotated about the axis of the mandrel while still warm. The rotating assemblies are then trimmed, partitioned and disassembled. In one embodiment, the trimming process forms an integral flange. A gasket may be interposed between nut and flange.

DETAILED DESCRIPTION

Figure 1:
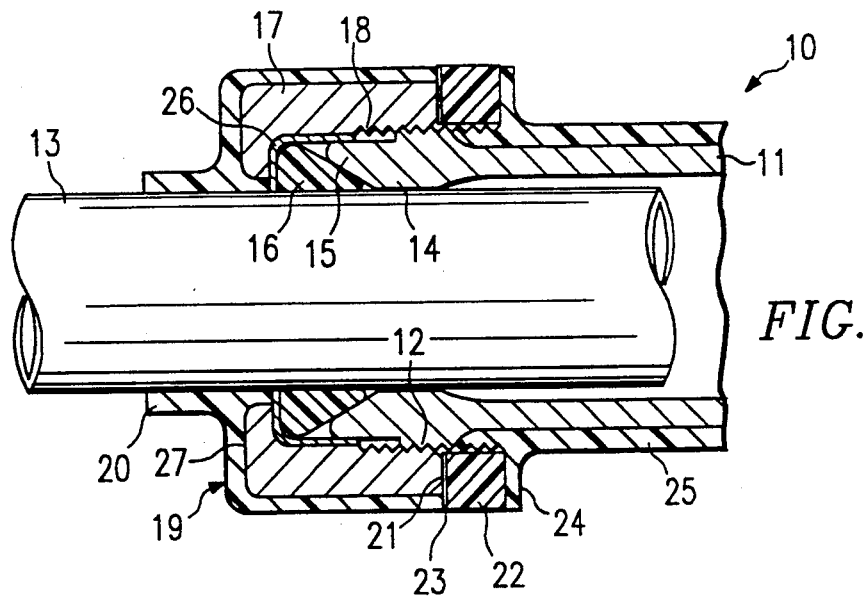
FIG. 1 is a cross section of a plastic coated metallic coupling manufactured in accordance with the teachings of the present invention.

FIG. 1 illustrates a coupling 10 manufactured in accordance with the teachings of the present invention. The components of the coupling include a body 11 having a threaded portion 12 at one or both ends. The coupling body is intended to restrain the lateral movement of a pipe 13 about which it is assembled with the provision of an optional pilot surface 14. A tapered portion 15 of the body engages a sealing gasket 16. A nut 17 having internal threads 18 and end face 21, engages the external threads 12 of the coupling body. As the assembly has been coated with a P.V.C. or Plastisol brand coating, the nut has an exterior plastic layer 19. The coating on the nut includes an integral collar 20.

Formed into the exterior coating 25 of the body 11, as a result of the coating and parting process, is an upstanding flange 24. A corrosion ring 22, made from sponge rubber or a similar resilient polymer and having a mylar face 23 is bonded to the flange 24. The ring 22 acts as a moisture barrier. The mylar serves to inhibit seal extrusion, abrasion and friction.

Figure 2:
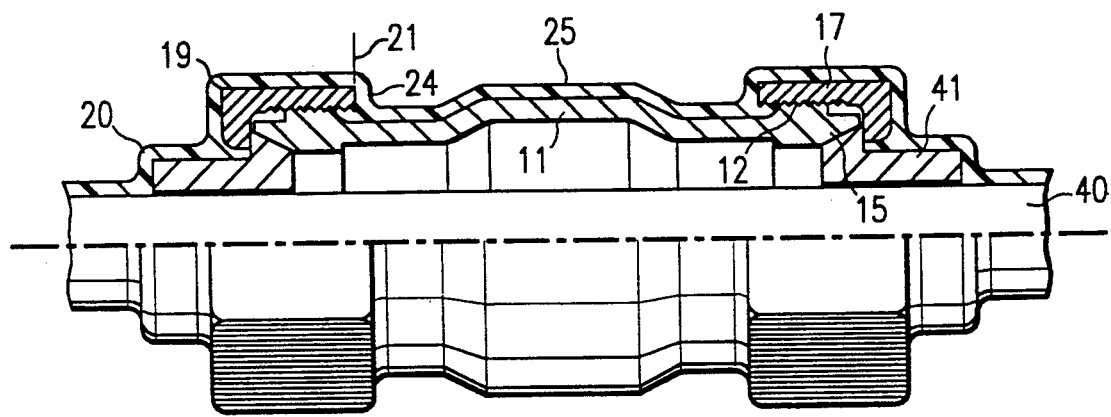
FIG. 2 is a partial cross section of the coupling shown in FIG. 1. The coupling is shown mounted upon a mandrel, after coating, but before trimming.

The coupling shown in FIG. 1 is manufactured according to the following method. As shown in FIG. 2 a mandrel is prepared upon which one or more couplings are assembled end to end. When couplings are assembled on the mandrel, sealing gaskets 16 and gasket retainers 26 are omitted, as is the corrosion ring 22, 23. Two or more couplings may be assembled in an end to end relationship on a single mandrel 40. A masking 41 is employed which supports the body from the inside. Sufficient space must be left between couplings on the mandrel to allow a suitable collar 20 to remain after subsequent trimming operations. The coupling nuts 17 are then advanced on the coupling bodies 11 to a predetermined depth. One or more couplings assembled on a mandrel are then dipped into a P.V.C. or Plastisol brand coating or other liquid polymer solution. The assemblies are rotated to promote even distribution of the plastic coating. The assemblies are removed from the coating bath and are moved to a curing oven. After curing, the couplings undergo a trimming operation while still warm and rubbery. It is necessary to part the coupling body and nut and trim excess material from the collar. The coupling is rotated about its axis and excess material is trimmed from the collar 20. The nut is separated from the body by introducing a blade along the end face 21 of the nut 17. In this way the coupling components are parted and the body flange 24 is simultaneously formed. When the parts have cooled the corrosion ring 22 including the thin plastic ring 23 may be applied, either separately or as an assembly.

Figure 3:
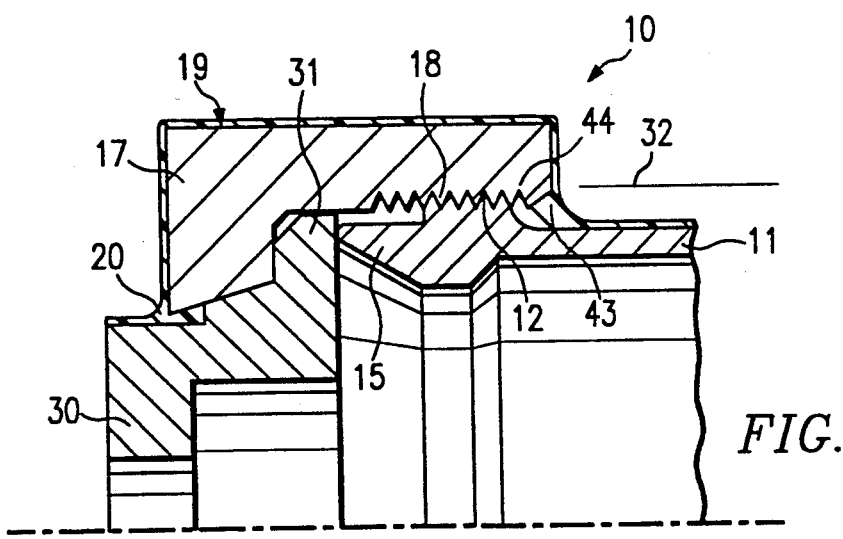
FIG. 3 is a partial cross sectional view of a plastic coated coupling made in accordance with further teachings of the present invention, shown mounted with a masking, before trimming.

The coupling shown in FIG. 3 is coated by assembly on a mandrel in a fashion similar to that described with respect to the coupling of FIG. 1. In FIG. 3 it can be seen that a nut masking 30 has been utilized, permitting the use of a smaller mandrel. The nut masking 30 also includes a spacer portion 31 which is used to pre-position the nut with respect to the coupling body 11. After curing and while still warm the nut and body as shown in FIG. 2 are parted by the movement of a blade axially along a radius 32 which is equal to one-half the major diameter of the exterior threads 12 of the coupling body 11. In using this method, a flange is not formed on the coupling body. As in the coupling described with reference to FIGS. 1 and 2, plastic threads 43 may be formed in place, if desired, at the same time that the coating is formed. To form a plastic thread for sealing engagement with the nut 17, extra threads 44 are provided on the nut. Mold release agents or the absence of primer insure that the plastic teeth do not adhere excessively after being formed.

While we have described above the principles of the invention in connection with specific process steps and equipment, it is to be clearly understood that this description is made only by way of example and not as a limitation to the scope of our invention as set forth in the objects thereof and in the accompanying claims.

What is claimed is:

1. An improved plastic coated pipe coupling, the improvement comprising:
   a coupling nut having an end face and an exterior plastic coating, the coating forming an integral collar;
   a coupling body having a plastic coating, the body coating having an integral upstanding flange, the body threadedly engaging said nut; and
   a resilient annular moisture barrier adhered to said integral upstanding flange and engaging the plastic coating on the coupling nut at the end face of the coupling nut.

2. The pipe coupling of claim 1, further comprising a thin polymeric abrasion resistant anti-frictional element located adjacent to the moisture barrier opposite the upstanding flange.

3. An improved plastic coated pipe coupling, the improvement comprising:
   a threaded metallic coupling nut having an end face and polymer coating having an integral collar thereon;
   a threaded metallic body having a plastic coating with an integral upstanding flange thereon, the flange having at least one face perpendicular to the axis of the body, the body threadedly engaging the nut;
   a resilient annular moisture barrier having a face of thin polymeric abrasion resistant and anti-frictional material; and
   the flange and end face adapted to engage the moisture barrier therebetween.

4. An improved plastic coated pipe coupling, the improvement comprising:
   a threaded metallic coupling nut having an end face and an exterior polymeric coating, the end face being uncoated;
   a threaded metallic body having a plastic coating with an integral upstanding flange formed thereon, the flange having at least one face perpendicular to the axis of the body, the body threadedly engaging the nut;
   a resilient annular moisture barrier;
   the flange and end face adapted to engage the moisture barrier therebetween;
   the resilient annular moisture barrier having a face of thin polymeric abrasion resistant and anti-frictional material.

5. The improved plastic coated pipe coupling of claim 4 wherein said abrasion resistant and anti-friction material is mylar.

6. An improved plastic coated pipe coupling, the improvement comprising:
   a mandrel;
   a metallic coupling nut located on the mandrel having an end face, and an exterior polymeric coating;
   a metallic body located on the mandrel having a plastic coating and a flange having at least one face perpendicular to the axis of the body;
   a spacer for locating the nut on the mandrel with respect to the body; and
   a means for separating the nut from the body between the end face and flange.

7. An improved plastic coated pipe coupling, the improvement comprising:
   a mandrel for aligning said couplings end to end;
   a metallic coupling nut located on the mandrel having an end face, and an exterior polymeric coating having an integral collar;
   a metallic body having a plastic coating having an integral upstanding flange, the flange having at lest one face perpendicular to the axis of the body;
   a resilient moisture barrier;
   a spacer for repositioning the nut with respect to the body; and
   a means for separating a nut and body between the end face and flange whereby said flange and end face are adapted to engage the moisture barrier therebetween.

* * * * *